United States Patent [19]

Suzuki

[11] Patent Number: 4,903,733
[45] Date of Patent: Feb. 27, 1990

[54] SLIDING EXHAUST BRAKE SYSTEM

[75] Inventor: Ryoichi Suzuki, Mishima, Japan

[73] Assignee: USUI Kokusai Sangyo Kaisha Ltd., Sunto, Japan

[21] Appl. No.: 246,628

[22] Filed: Sep. 20, 1988

[30] Foreign Application Priority Data

Sep. 26, 1987 [JP] Japan .................. 62-147250[U]

[51] Int. Cl.$^4$ .............................. F16K 3/02
[52] U.S. Cl. .................. 137/630.12; 123/323; 188/273; 251/84; 251/326
[58] Field of Search .............. 188/273; 123/323; 251/84, 175, 326; 137/630.12, 630.14, 630.15

[56] References Cited

U.S. PATENT DOCUMENTS

| 181,677 | 8/1876 | Hendrickson | 137/630.12 |
| 4,054,156 | 10/1977 | Benson | 188/273 X |
| 4,205,704 | 6/1980 | Benson | 137/630.12 |
| 4,553,648 | 11/1985 | Suzuki et al. | 188/273 |
| 4,643,226 | 2/1987 | Bälz | 251/326 X |
| 4,669,585 | 6/1987 | Harris | 251/326 X |

FOREIGN PATENT DOCUMENTS

| 119926 | 9/1980 | Japan | 123/323 |
| 44095 | 3/1916 | Sweden | 251/326 |
| 4311 | 11/1818 | United Kingdom | 251/326 |

Primary Examiner—Robert E. Garret
Assistant Examiner—Mark A. Williamson
Attorney, Agent, or Firm—Anthony J. Casella; Gerald E. Hespos

[57] ABSTRACT

A sliding exhaust brake system installed on a large-sized vehicle. The system comprises a main valve member for opening and closing an exhaust passage and an auxiliary valve mechanism. The auxiliary valve mechanism consists of a support frame of a substantially C-shaped cross section and a liner mounted inside the frame. The liner has tonguelike portions at its both side ends. The tonguelike portions extend under the support frame.

5 Claims, 3 Drawing Sheets

SLIDING EXHAUST BRAKE SYSTEM

BACKGROUND OF THE INVENTION

1. Field of the Invention

The present invention relates to improvement in the structure of the auxiliary valve mechanism of a sliding exhaust brake system which is installed in the exhaust pipe of a large-sized vehicle, such as a truck or bus, and acts to close off the exhaust passage for the exhaust gas flowing through the exhaust pipe when the vehicle is going down steep hills, thereby braking the vehicle.

2. Description of the Prior Art

The present inventor et al. filed U.S. Pat. Ser. No. 146,841 on Jan. 22, 1988, for an auxiliary valve mechanism that is used in an exhaust brake system of this kind. This valve mechanism is shown in FIGS. 8-10, where the auxiliary valve mechanism, indicated by numeral 17, is fixed to the front end of a piston rod 16. A support frame 18 of a substantially C-shaped cross section is mounted to the front surface of a fixed block member 20 located near the front end of the rod 16. The frame 18 engages with a valve member 15 provided with an exhaust pressure-adjusting hole 14. A liner 19 is mounted loosely inside the frame 18 and makes a frictional contact with the bottom wall of the valve member 15. Both longitudinal ends of the liner 19 are bent upwardly. The auxiliary valve mechanism 17 is buried in the frame 18 and in the liner 19.

Generally, the aforementioned sliding exhaust brake system has an air cylinder system incorporating a coil spring that urges the piston rod upward at all times. When the brake system operates, the coil spring is caused to expand and contract repeatedly. As a result, the piston and the piston rod are rotated.

In the above-described known auxiliary valve mechanism 17, since the liner 19 is loosely mounted and buried in the support frame 18, the frame 18 swings in response to the rotation of the piston. Therefore, one or both longitudinal ends of the frame 18 are rubbed against the surface of the valve member 15 and also against the inner surface of the housing of the body of the exhaust brake, as shown in FIG. 10. As a result, they locally wear away or get damaged. Then, the operation is not performed satisfactorily. Also, the lifetime of the manufactured product is shortened. Hence, it cannot be used for a long period.

SUMMARY OF THE INVENTION

It is an object of the invention to provide a sliding exhaust brake system which has tonguelike portions permitting a support frame to rotate as mentioned above within the wall thickness of the tonguelike portions and which prevents the tonguelike portions from rubbing against a valve member and also against the inner surface of the housing to thereby allow smooth and reliable operation, prevent local wear and damage, and enable the system to be used for a long period.

The above object is achieved in accordance with the teachings of the invention by a sliding exhaust brake system comprising: an exhaust passage having protruding walls at its both side ends, an exhaust pipe extending through the walls; a valve working space formed in the housing of the body of an exhaust brake; a main valve member taking the form of a flat sheet and reciprocating in the valve working space which extends substantially at right angles to the exhaust passage, the main valve member being mounted in the housing; an exhaust pressure-adjusting hole extending through the main valve member; an air cylinder mounted over the valve working space and having a diaphragm through which a piston rod extends; a fixed block member with which the main valve member engages and which is fixed to the front end of the piston rod; a support frame of a substantially C-shaped cross section, the frame being mounted to the front surface of the block member; a liner cooperating with the support frame to form an auxiliary valve mechanism which is fixed to the piston rod near the front end of the rod, the liner being loosely mounted in the support frame, the liner making a frictional contact with the bottom wall of the main valve member, both longitudinal ends of the liner being bent upward; and tonguelike portions formed at side ends of the liner and extending under the support frame. When the piston rod is moved in one direction, the liner of the auxiliary valve mechanism closes the exhaust pressure-adjusting hole, and the front end of the piston rod causes the main valve member to close off the exhaust passage. When the piston rod is moved in the opposite direction, the liner opens the exhaust pressure-adjusting hole, and the auxiliary valve member engages with the main valve member to cause it to open the exhaust passage.

In the sliding exhaust brake system constructed as described above, the tonguelike portions of the liner extend under the outer periphery of the support frame. The lower end of the support frame is raised from the surface of the main valve member by a distance corresponding to the wall thickness of the tonguelike portions, and the auxiliary valve mechanism is formed.

Other objects and features of the invention will appear in the course of description thereof which follows.

DETAILED DESCRIPTION OF THE PREFERRED EMBODIMENTS

Figure 1:
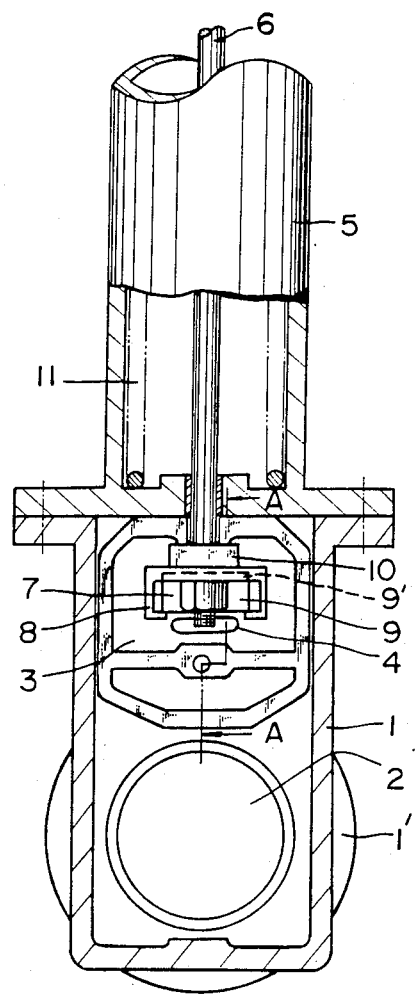
FIG. 1 is a partially cutaway plan view of a sliding exhaust brake system according to the invention.
Figure 2:
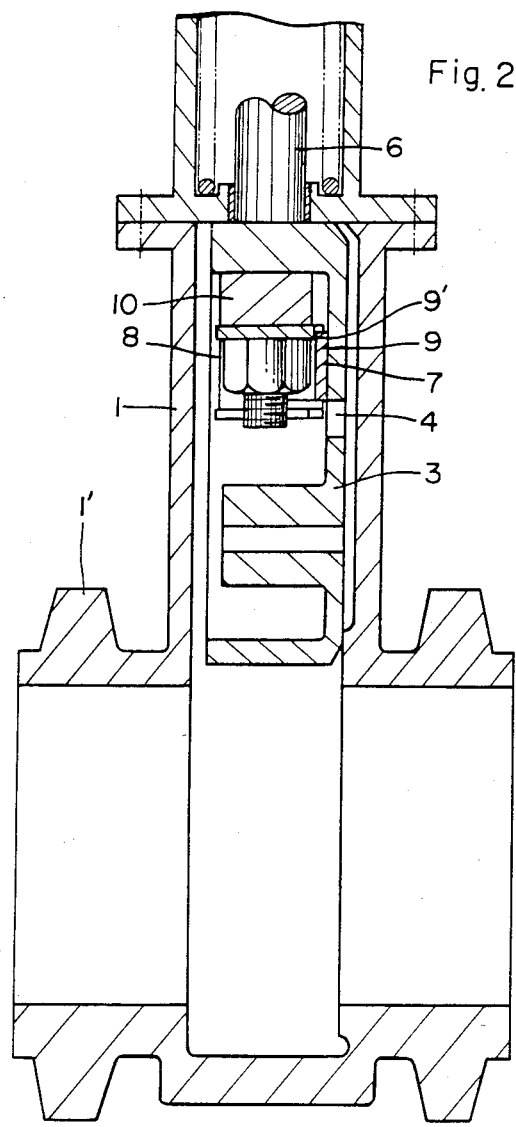
FIG. 2 is an enlarged cross section taken on line A—A of FIG. 1.
Figure 3:
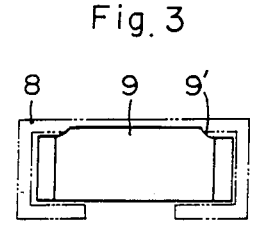
FIG. 3 is a plan view of the liner and the support frame shown in FIG. 1.
Figure 4:
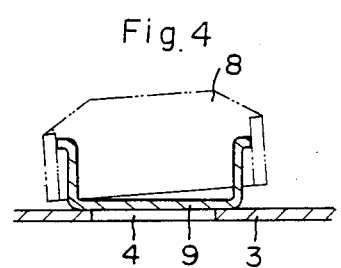
FIG. 4 is a front elevation of the liner and the support frame shown in FIG. 3.

Referring to FIGS. 1-7, the body of each exhaust brake system according to the invention has a housing 1 provided with a valve working space in which a valve member 3 in the form of a flat sheet reciprocates. An exhaust passage 2 has protruding walls 1' at its both side ends. An exhaust pipe (not shown) extends through the walls 1' and is connected to the exhaust passage 2. The valve working space extends substantially at right angles to the exhaust passage 2. A valve member 3 is mounted inside the valve working space and provided with an exhaust pressure-adjusting hole 4 extending through it. An air cylinder system 5 is mounted over the valve working space and has a diaphragm through which a piston rod 6 extends. The valve member 3 is fixed to the rod 6 near the front end of the rod.

An auxiliary valve mechanism 7 comprises a support frame 8 of a substantially C-shaped cross section and a liner 9 loosely mounted inside the frame 8. The frame 8 is mounted to the front surface of a fixed block member 10. The auxiliary valve mechanism 7 is mounted inside the valve member 3 and in front of the front end of the piston rod 6. The auxiliary valve mechanism 7 engages with the valve member 3. Both longitudinal ends of the liner 9 are bent upward.

Figure 5:
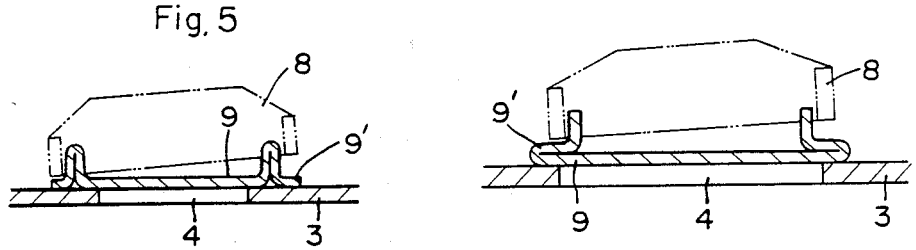
FIGS. 5-7 are views similar to FIG. 4, but showing other examples of the invention.
Figure 6:
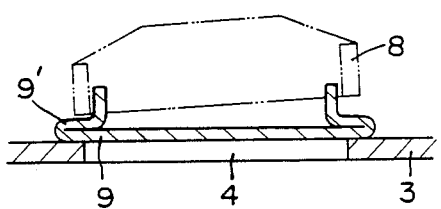
Figure 7:
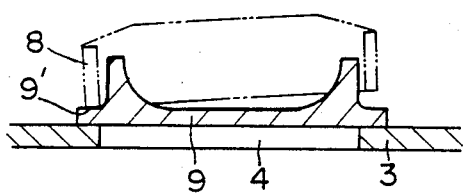
Figure 8:
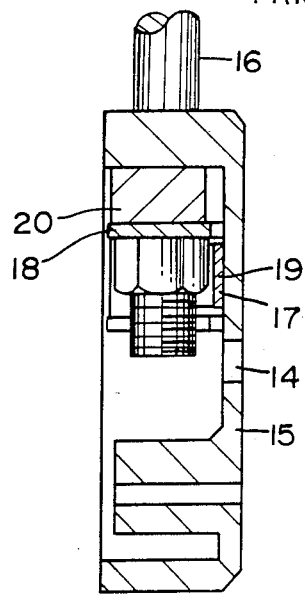
FIG. 8 is a vertical cross section of a known valve mechanism.
Figure 9:
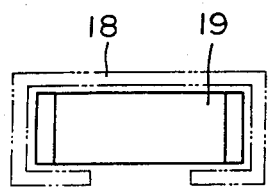
FIG. 9 is a plan view of the liner buried in the support frame shown in FIG. 8.
Figure 10:
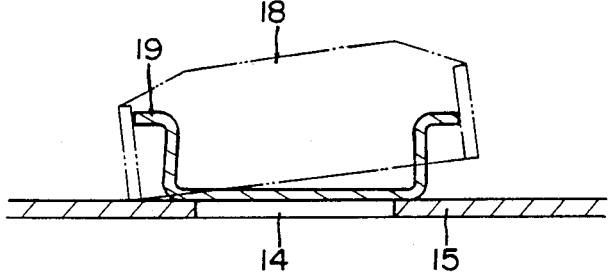
FIG. 10 is a front elevation of the liner and the support frame shown in FIG. 8.

The liner 9 has tonguelike portions 9' at its lateral ends. The tonguelike portions 9' extend under the outer periphery of the support frame 8. As shown in FIGS. 5 and 6, a sheet may be bent to form the tonguelike portions 9' at both longitudinal ends of the liner 9. As shown in FIG. 7, the liner 9 may be a casting, and the tonguelike portions 9' may be formed at both longitudinal ends in the same manner as the liner shown in FIGS. 5 and 6. In this case, the tonguelike portions 9' are located under the side ends of the support frame 8. A coil spring 11 is mounted in the air cylinder system 5 to urge a piston (not shown) upward at all times.

As described thus far, in the novel sliding exhaust brake system, the liner 9 has the tonguelike portions 9' at its side ends. The tonguelike portions 9' extend under the outer periphery of the support frame 8. When the exhaust passage is opened and closed, the coil spring 11 expands and contracts. In response to this, the piston and the piston rod 6 rotate to and fro, swinging the support frame 8 within the wall thickness of the tonguelike portions 9'. In spite of this swinging movement, it is unlikely that one or both longitudinal ends of the tonguelike portions rub against the valve member 3 and against the inner surface of the housing 1. This permits the brake system to be operated smoothly and certainly. Also, local wear and damage can be prevented. Consequently, the lifetime of the brake system is increased. That is, the novel brake system can be used for a long period, and is quite useful.

What is claimed is:

1. A sliding exhaust brake system comprising:
   a housing having an exhaust passage extending therethrough and a valve working space communicating with the exhaust passage;
   a main valve mounted in the valve working space for reciprocating movement into and out of the exhaust passage, the main valve comprising a generally flat bottom wall for selectively blocking the exhaust passage, an exhaust pressure adjusting hole extending through the bottom wall;
   a cylinder and piston assembly mounted in proximity to the valve working space of the housing, said assembly comprising a piston rod having an end reciprocally movable in the valve working space selectively toward and away from the exhaust passage;
   a block mounted to the piston rod in spaced relationship to the end thereof, said block being disposed to engage the main valve in response to movement of the end of the piston rod away from the exhaust passage;
   a support frame of substantially C-shaped cross section, said support frame comprising a base and a pair of arms connected to and extending from the base, said base being mounted to said piston rod intermediate the end thereof and the block; and
   a liner comprising a generally flat portion slidably movable along the flat bottom wall of the main valve for selectively opening and closing the exhaust pressure adjusting hole extending through the bottom wall, said liner comprising a pair of opposed longitudinal ends angularly aligned to the flat portion thereof and extending away from the bottom wall of the main valve member, said ends of said liner being loosely engaged intermediate the base and the arms of the support frame, said liner further comprising at least one tongue disposed intermediate the support frame and the bottom wall of the main valve for preventing contact between the support frame and the bottom wall of the main valve, wherein movement of the end of the piston rod away from the exhaust passage moves the liner away from the exhaust pressure adjusting hole and subsequently urges the block against the main valve for urging the main valve out of the exhaust passage, and wherein movement of the end of the piston rod toward the exhaust passage urges the liner over the exhaust pressure adjusting hole and urges the main valve into the exhaust passage.

2. The sliding exhaust brake system of claim 1, wherein said liner is made from a sheet or plate.

3. The sliding exhaust brake system of claim 2, wherein said sheet or plate is bent to form a pair of said tongues at the respective longitudinal ends of the liner.

4. The sliding exhaust brake system of claim 1, wherein said liner is a casting.

5. The sliding exhaust brake system of claim 4, comprising a pair of said tongues formed integrally with the respective longitudinal ends of the casting.

* * * * *